W. SHAW.
STARTING AND STOPPING MECHANISM.
APPLICATION FILED NOV. 24, 1913.

1,243,769.

Patented Oct. 23, 1917.

WITNESSES.
Herbert W. Kenway
Martha W. Coupe

INVENTOR.
Walter Shaw
By his Attorney,
Nelson W. Howard

UNITED STATES PATENT OFFICE.

WALTER SHAW, OF DEDHAM, MASSACHUSETTS, ASSIGNOR TO UNITED SHOE MACHINERY COMPANY, OF PATERSON, NEW JERSEY, A CORPORATION OF NEW JERSEY.

STARTING AND STOPPING MECHANISM.

1,243,769.     Specification of Letters Patent.     Patented Oct. 23, 1917.

Application filed November 24, 1913. Serial No. 802,706.

*To all whom it may concern:*

Be it known that I, WALTER SHAW, a citizen of the United States, residing at Dedham, in the county of Norfolk and State of Massachusetts, have invented certain Improvements in Starting and Stopping Mechanisms, of which the following description, in connection with the accompanying drawings, is a specification, like reference characters on the drawings indicating like parts in the several figures.

This invention relates to starting and stopping mechanisms of that type wherein a clutch partially under manual control, is disengaged at a predetermined point in the cycle of operations of a machine so that the operating parts come to rest always in the same positions.

In the embodiment of the invention herein disclosed the clutch is shifted by a cam through interposed transmission devices. By interrupting effective connection through the transmission devices the clutch is permitted to move into its engaging position to start the machine and the machine continues to operate until the transmission devices are rendered operative so that, at the proper time in the cycle, the action of the clutch throwing cam may be transmitted to the clutch.

The present invention contemplates the provision of improved means for locking the transmission devices in operative position whereby a positive action is secured and the uncertainties of frictional locking are eliminated. Certain features of the invention render the locking means susceptible of being unlocked and the transmission devices released by the application of a slight pressure through a short distance.

Important results of mechanism of the present invention are that the machine is guarded against accidental starting, while at the same time, when it is desired to start the machine this may be effected very easily. Moreover, when the machine is once stopped there is no danger of the locking means being released by the vibration caused by the running of the loose pulley.

One type of starting and stopping mechanism which has been used heretofore is well illustrated in Letters Patent of the United States No. 672,056, granted April 16, 1901, to J. F. Davey et al., and the present invention will be described for purposes of illustration as embodied in mechanism employing a clutch and clutch-thrower similar to those shown in said patent. The invention, however, is in no sense limited to starting and stopping mechanism of this character but is of general application.

The features and advantages above mentioned and others incident to the invention will appear from the following detailed description of the mechanism shown in the accompanying drawings, in which,—

Figure 1:
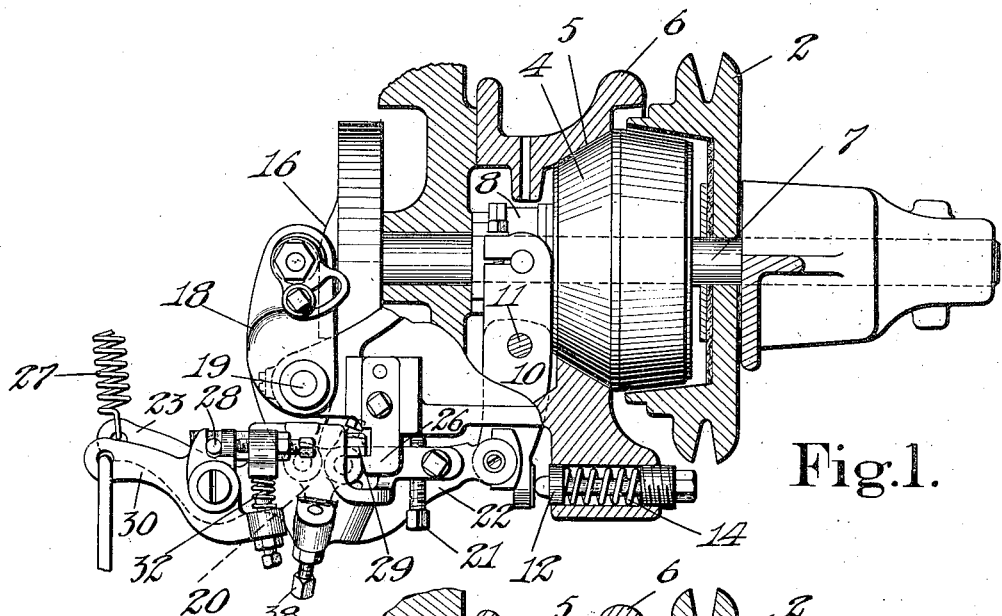
Figure 1 is a view in side elevation, partly in section, showing the transmission devices locked in effective position and the clutch disengaged.

The clutch consists of a belt driven pulley 2, and a friction member 4, together with the brake surface 5 formed in a part of the frame 6. The pulley is loosely mounted upon a shaft 7 and the friction member 4 is keyed or otherwise connected with the shaft to permit axial movement. The friction member 4 has two oppositely disposed frusto-conical surfaces one of which, when the clutch is engaged, fits into a correspondingly shaped friction surface formed in the pulley 2 and the other of which contacts, when the clutch is disengaged, with the brake surface 5 to arrest the rotation of the shaft. The friction member 4 is moved axially on the shaft by a shifting arm 10 pivoted to the frame on a stud 11 and connected with a loose collar 8 rotatably mounted on the hub of the friction member.

Figure 2:
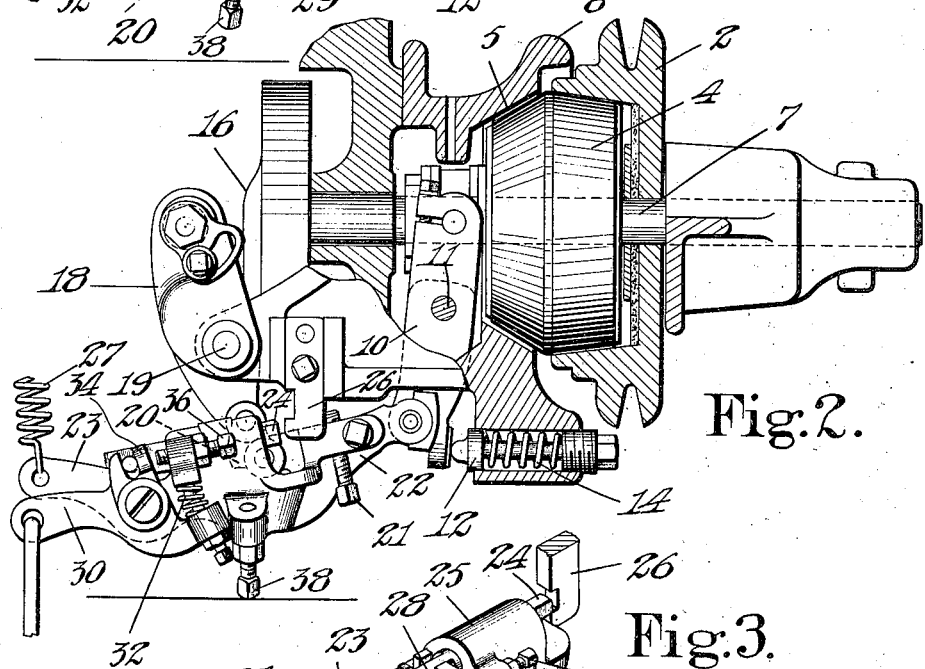
Fig. 2 is a similar view showing the transmission devices unlocked and the clutch engaged.
Figure 3:
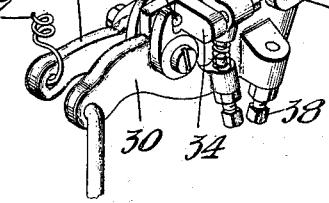
Fig. 3 is a view in perspective of the locking devices.

A plunger 12 mounted in a recess in the frame of the machine is urged forward by a spring 14 and when unimpeded holds the friction arm in position to cause the clutch to engage, that is, to cause the friction member to engage the pulley 2 as shown in Fig. 2. The action of the spring 14 is opposed in moving the shifting arm to disengage the clutch by the clutch-thrower cam 16 on the shaft 7 and the cam lever 18 pivoted at 19 to the frame of the machine.

The action of the clutch-thrower-cam 16 is communicated to the shifting arm 10 through transmission devices comprising the cam lever 18 and toggle links 20 and 22.

When the toggle links are held rigidly against relative angular movement effective communication is established between the clutch-thrower and the clutch so the cam 16 will act at the proper time to disengage the clutch, but when the toggle links are permitted to move angularly effective communication is interrupted and, until the toggle links are again rigidly held, the spring 14 will hold the clutch in engagement to drive the shaft.

The short toggle link 20 is pivoted to the lower end of the cam lever 18 and the long toggle link 22 is pivoted to the lower end of the shifting arm 10. The link 22 is provided with a projecting arm 23 to which is connected a tension spring 27 which acts normally to move the toggle links upwardly into their operative position. This position is determined by a set screw 21 threaded into a projecting flange on the link 22 and arranged to engage a portion of the frame as shown in Fig. 1. When the links are operative they are held in a slightly broken condition. This is desirable as it requires less pressure to move the toggle links from such an initial position into an inoperative relation than it would to move them from an initial position in which they were alined into an inoperative position. When the links are held in their operative position, as shown in Fig. 1, the action of the clutch-thrower cam is transmitted through them as if they constituted a rigid strut and at such times the set screw 21 will slide on the frame. Locking of the toggle links in effective position is accomplished by a locking bolt 24 slidingly mounted in a boss 25 on the link 22 and arranged to engage a stationary hook shaped stop or abutment 26 permanently bolted to the machine frame. At its rear end the locking bolt 24 is provided with a transverse pin 28 which is received in forks projecting upwardly from a pivoted treadle lever 30. The treadle lever 30 is mounted on the arm 23 of the link 22 and is acted upon by a compression spring 32 in such a manner as to tend to project the locking bolt outwardly, toward the right in Fig. 1. The lever 30 has a transversely extending ear 34 which is arranged to engage an adjustable stop 36 at one side of the boss 35 and so determine the limit of the inward movement of the locking bolt 24. By adjusting the stop 36 it is possible to regulate the amount by which the locking bolt 24 projects over the edge of the abutment 26 and thus control the movement of the locking bolt necessary to release the transmission links.

The link 22 is provided on its front side with an ear in which is adjustably mounted the stop 38. When the treadle is depressed and the transmission links moved into inoperative position the stop 38 will engage the table upon which the machine rests and so limit the downward movement of the parts.

As shown in Fig. 1, the parts of the mechanism occupy their stopped position and the pulley 2 may be rotated idly. When it is desired to start the machine the treadle is depressed and through the treadle rod the treadle lever 30 is rocked in a contra-clockwise direction against the compression of the spring 32. This movement retracts the locking bolt 24 until it disengages the abutment 26. Thereupon the further depression of the treadle breaks the toggle links or the endwise pressure of the plunger 12 on the slightly broken links effects the same result. However that may be, the plunger 12 is at once permitted to swing the shifting lever 10 and move the clutch into engagement with the pulley. Thereupon the shaft 7 is set in rotation and this is continued as long as the treadle is held depressed. When the treadle is released the spring 27 at once restores the links to their operative position and in this position they are automatically locked by the locking bolt 24. Subsequently, and at the proper point in the cycle of the machine, the high point of the clutch-thrower cam 16 rocks the cam lever 18 and transmits through the toggle links the disengaging movement of the clutch member.

Having thus described my invention, what I claim as new and desire to secure by Letters Patent of the United States is:—

1. Starting and stopping mechanism comprising a frame, a clutch member movably mounted in the frame, a clutch-thrower, relatively movable transmission pieces interposed between the clutch-thrower and the clutch member, and locking means arranged to connect one of the transmission pieces temporarily to the frame in which the clutch member is mounted.

2. Starting and stopping mechanism comprising a frame, a clutch member movably mounted in the frame, a clutch-thrower, relatively movable transmission pieces interposed between the clutch-thrower and the clutch member, and coöperating locking devices for holding the transmission pieces in operative condition, one device being located on the frame in which the clutch member is mounted and the other on one of the transmission pieces.

3. Starting and stopping mechanism comprising a clutch-thrower and clutch interposed relatively movable transmission pieces, a stationary support, and a sliding locking member for temporarily locking one transmission piece to the support.

4. Starting and stopping mechanism comprising a clutch-thrower and clutch interposed relatively movable transmission pieces, a sliding locking member mounted on one of said pieces, and treadle operated means for controlling the position of said locking member.

5. Starting and stopping mechanism comprising a clutch-thrower and clutch interposed relatively movable transmission pieces, a locking bolt normally spring projected, and a pivotally mounted treadle controlled lever for retracting the bolt.

6. Starting and stopping mechanism comprising a clutch-thrower and clutch interposed relatively movable transmission pieces, a spring tending normally to hold them in operative relation, a spring projected bolt arranged to lock the pieces in operative position, and a pivoted bolt-retracting member mounted on one of the transmission pieces.

7. Starting and stopping mechanism comprising a clutch-thrower and clutch interposed toggle links, one of said links having bearings for a sliding locking bolt, a pivoted lever mounted on said link and connected to the sliding bolt, and a stationary support arranged to be engaged by the locking bolt, whereby the links may be held in a slightly broken condition.

8. Starting and stopping mechanism comprising a clutch thrower and clutch, interposed toggle links, a locking device arranged to hold the links positively against angular movement, and means for adjustably controlling the extent of locking engagement of said device.

9. Starting and stopping mechanism comprising a clutch and clutch throwing cam, interposed transmission links, locking mechanism including a sliding latch piece and a coöperating abutment normally arranged to hold the transmission links positively against relative movement while the clutch occupies its stopped position.

10. Starting and stopping mechanism comprising a frame, a clutch member mounted in the frame, relatively movable transmission pieces suspended from the frame and connected to the clutch member, and locking means arranged to connect one of the transmission pieces temporarily to the frame in which the clutch member is mounted to hold said piece in operative position.

11. Starting and stopping mechanism comprising a frame, a one-piece shaft journaled in the frame, a loose pulley and a shiftable clutch member mounted on the shaft, pivoted transmission links suspended from the frame and connected to the clutch member, and locking means arranged to connect one of the transmission links temporarily to the frame at a point above the center line of the links.

12. Starting and stopping mechanism comprising a frame, a clutch member 4 mounted within the frame, a clutch thrower 16, interposed transmission links, a locking member 26 on the frame in which the clutch member is mounted, and a coöperating locking member 24 for the transmission links.

In testimony whereof I have signed my name to this specification in the presence of two subscribing witnesses.

WALTER SHAW.

Witnesses:
JOSEPH F. WOGAN,
ROBERT B. SMITH.